Aug. 25, 1936.　　B. S. OKNER ET AL　　2,052,108
BEARING
Filed March 6, 1935　　2 Sheets-Sheet 2
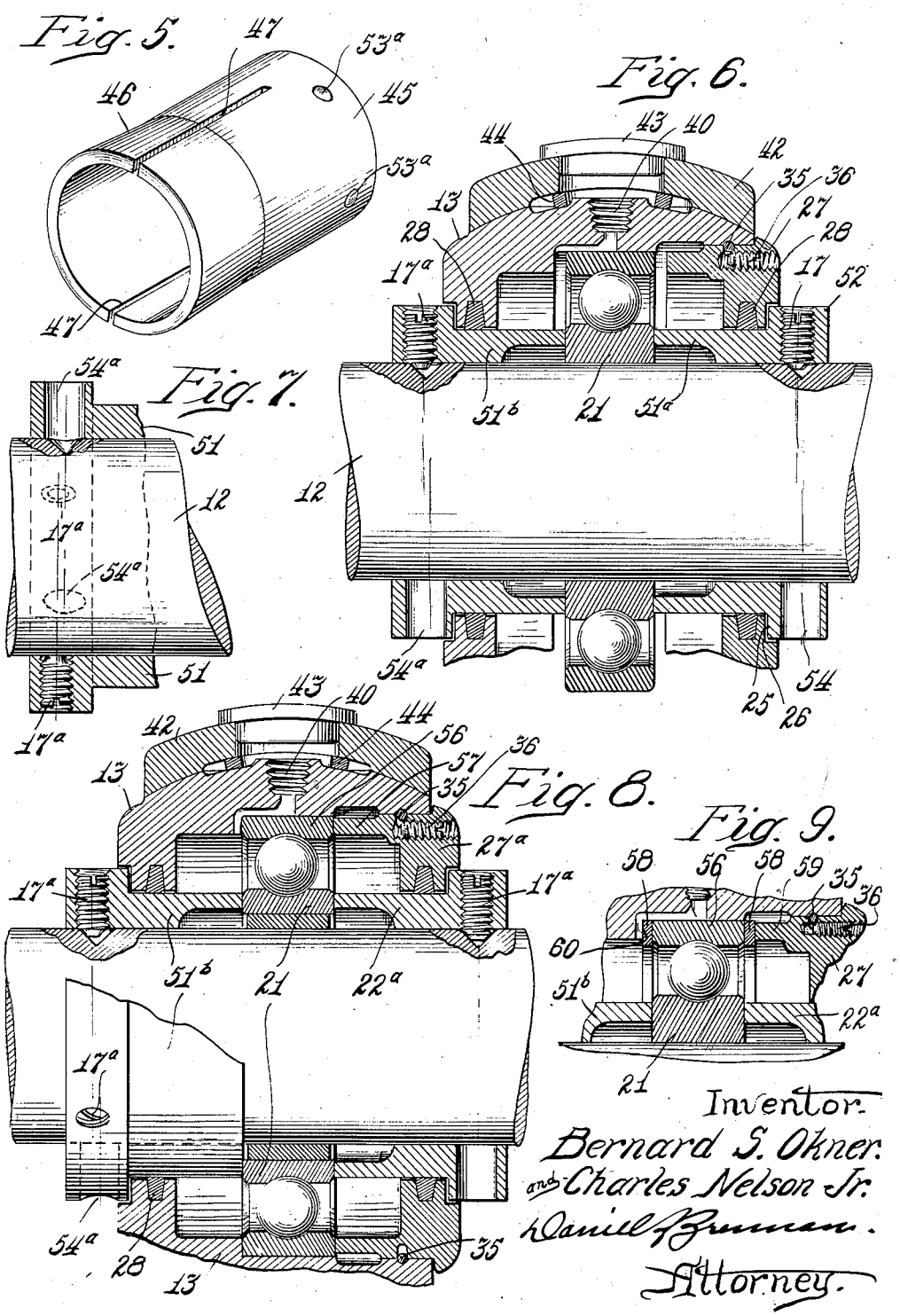
Inventor.
Bernard S. Okner.
and Charles Nelson Jr.
Daniel Brennan.
Attorney.

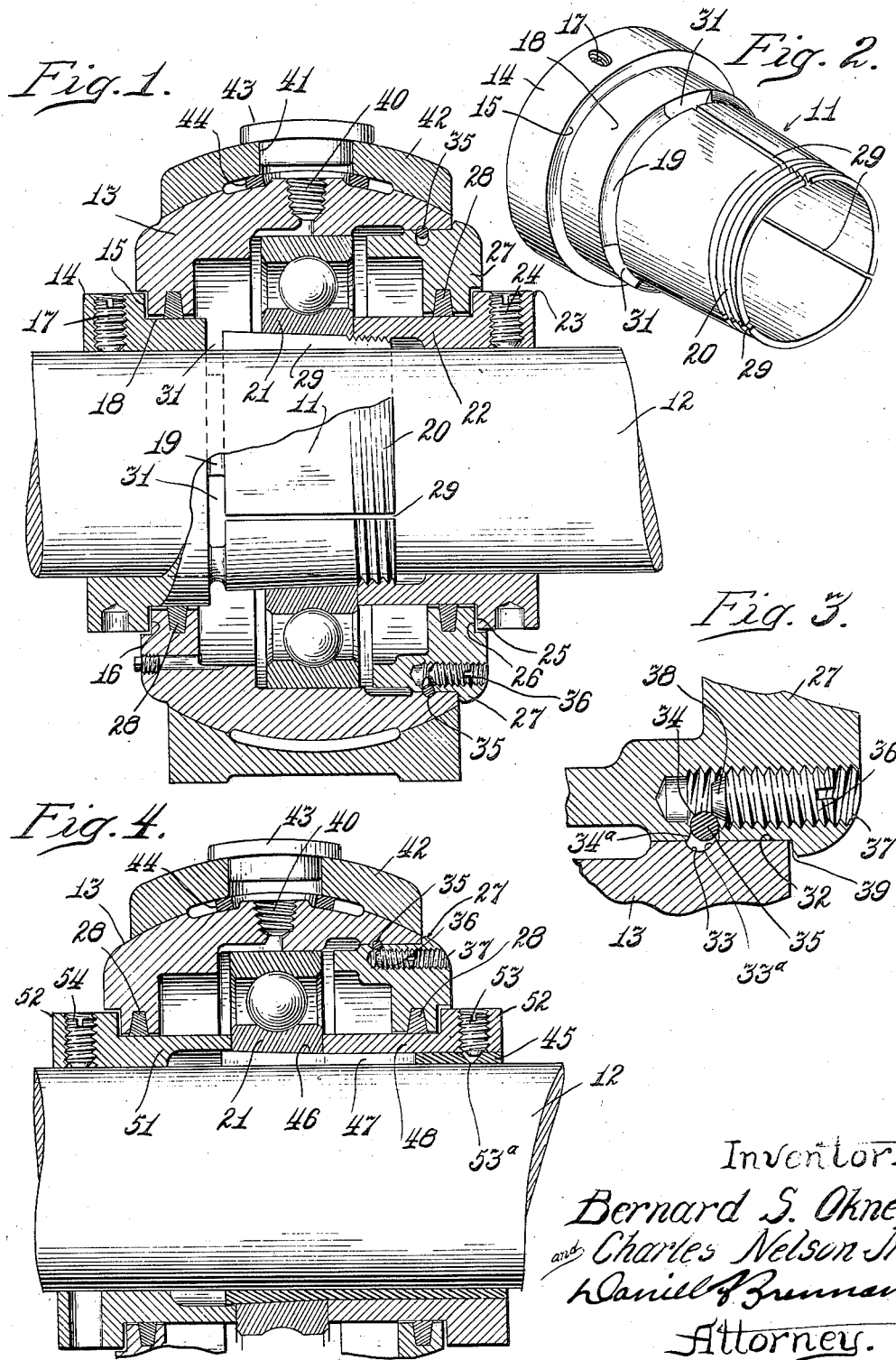

Patented Aug. 25, 1936

2,052,108

UNITED STATES PATENT OFFICE 2,052,108

BEARING

Bernard S. Okner and Charles Nelson, Jr., Chicago, Ill., assignors to Ahlberg Bearing Company, a corporation of Illinois Application March 6, 1935, Serial No. 9,646

11 Claims. (Cl. 308—236)

The invention relates to improvements in shaft mountings and more particularly to an improved mounting embodying novel means for positioning and securing anti-friction bearings on straight shafts and novel means to retain an oil lubricant within the mounting and exclude foreign matter and moisture therefrom.

One known method of securing the inner race of an anti-friction-bearing to a straight shaft is with a long sleeve having a tapered outside periphery over which the inner bearing race fits. In such instance, the sleeve is externally threaded at one end and slit its entire length. A collar is screwed on said sleeve to force the inner race along said sleeve to bind it thereto and contract the sleeve to bind it against the shaft. A common objection to an assembly of this character is that foreign matter enters the mounting through said slit, and a liquid lubricant cannot be used because of excessive leakage along said slit. Another objection is, that the outside edges of the slit cut the sealing rings (usually leather or felt,) fitted over the sleeve to prevent oil leakage, and render them useless. Known types of mounting assemblies also lack means to locate accurately and secure the inner race on the shaft to retain the bearing in its proper position relative to its housing. Such assemblies also require the use of spanner wrenches to hold one part of the mounting while turning another part to contract the split sleeve. The objections hereinbefore outlined are overcome in a practical manner by the improved mounting embodying the invention.

It is, therefore, an object of the invention to provide an improved mounting for anti-friction bearings embodying novel means to prevent lubricant leakage and the entrance of foreign matter.

Another object is to provide a mounting of the character referred to, embodying novel means to prevent destruction of the sealing rings.

Another object is to provide a mounting for a bearing embodying novel securing means to insure a proper working clearance between moving parts.

Another object is to provide a mounting for an anti-friction bearing including means adapted to abut the inner race of the bearing to insure proper locating of the latter with respect to other parts of the mounting.

Another object is to provide improved means to removably secure an annular cap in the bearing housing.

Another object is to provide an improved shaft mounting, embodying the features hereinbefore outlined, which can be readily and inexpensively constructed and is easy to assemble and highly efficient.

The foregoing and such other objects of the invention, as will become more apparent as the description proceeds, will be more readily understood from a perusal of the following specification, reference being had to the accompanying drawings, in which:

Fig. 1 is a longitudinal central sectional view of one embodiment of the improved shaft mounting, showing the male sleeve partially in elevation.

Fig. 2 is a perspective view of the male sleeve.

Fig. 3 is an enlarged detail sectional view of the end cap locking means.

Fig. 4 is a fragmentary longitudinal central sectional view, similar to Fig. 1, showing another embodiment of the invention.

Fig. 5 is a perspective view of one of the sleeves used in the mounting illustrated in Fig. 4.

Fig. 6 is a longitudinal sectional view, similar to Fig. 4 showing another form of construction.

Fig. 7 is a fragmentary sectional view of the mounting illustrated in Fig. 6, showing one of the sleeves temporarily secured on the shaft.

Fig. 8 is a longitudinal sectional view similar to Fig. 4, showing another form of construction.

Fig. 9 is a fragmentary sectional view showing another form of construction.

The embodiment of the invention illustrated in Figs. 1, 2, and 3, inclusive, includes a male sleeve 11 adapted to be fitted upon a straight shaft 12. The sleeve 11 is inserted in the bearing housing 13 through a shaft opening in the end wall thereof and has a flange 14 formed thereon providing a shoulder 15 adapted to be spaced from an annular recessed face 16 in said end wall. The flange 14 has a plurality of circumferentially spaced set screws 17 adapted to secure the sleeve 11 in position on the shaft 12 while assembling the bearing. A smooth unbroken periphery 18, formed on the sleeve 11 inwardly of shoulder 15, terminates at an external annular groove 19. The remaining portion of the sleeve 11 is of reduced diameter and is tapered downwardly towards its threaded end 20 to slidably receive the inner race 21 of an anti-friction bearing.

A female sleeve 22, also mounted on shaft 12, has a flange 23 at one end and is internally threaded at the other end. The sleeve 22 is screwed on the threaded end 20 of sleeve 11 and secured in position by set screws 24. The flange 23 provides a shoulder 25 adapted to be spaced from a recessed face 26 in an annular cap 27 removably secured in the open end of housing 13 in a manner described hereinafter. As shown, the housing 13 and the cap 27 each carry a sealing ring 28, preferably of felt or leather packing, which when the mounting is assembled, fits snugly around the peripheries of the sleeves 11 and 22 to provide a seal.

The sleeve 11 is slit longitudinally from its threaded end 20 to the groove 19, as at 29, so that it is contracted to engage the shaft when the female sleeve 22 is screwed on the male sleeve 11 to move the inner race 21 along the male sleeve. Portions of the groove 19 are cut away, as at 31, a short distance on each side of each longitudinal slit 29 to increase the contractability of the sleeve 11. It is apparent from the foregoing description that when the inner race 21 is wedged tightly around the tapered male sleeve 11 said sleeve tightly grips the shaft 12, and prevents movement of the inner race, independently of the shaft.

As noted hereinbefore, the annular cap 27 has a snug fit in the open end of housing 13. Any known practical means may be used to secure said cap in place, however, it is preferable to use the novel detachable securing means best illustrated, in detail, in Fig. 3. As shown, the inside periphery 32 of housing 13 has a shallow annular groove 33, spaced inwardly a short distance from the face of the housing. The cap 27 also has an external peripheral groove 34, of greater depth than groove 33, which contains a split wire ring 35, the normal tension of which retains said ring entirely below the periphery. One wall of this groove is inclined as at 34ª. One or more set screws 36 are screwed into tapped openings 37 in the cap, each having a tapered end 38 to engage inside the split ring 35 to urge said ring outwardly of its groove into engagement with groove 33 in housing 13. Hence, when the split ring is expanded the cap is securely held in place in the open end of the housing.

It is be noted, that groove 33 is cut to a depth slightly less than the radius of a cross section of the split ring, with one wall inclined, as at 33ª and that said groove 33 is arranged to be slightly out of alignment and inwardly of the groove 34, when the cap is in place. The off-setting of the grooves and their inclined opposed walls afford means to move the annular shoulder 39 of the cap tightly against the housing end wall when the split ring is expanded into groove 33, thus preventing oil leakage. The comparatively shallow groove 33 with its inclined wall 33ª permits easy removal of the end cap 27 when the mounting is disassembling, such removal being readily effected by forcing the cap outwardly to urge the split ring out of groove 33, after all the set screws 36 have been withdrawn from engagement therewith.

A lubricant is fed into the bearing mounting through a tapped hole 40 provided in the upper portion of housing 13. Access to said hole is obtained through a suitable opening 41 in the pillow block 42 which is closed by a removable dust cap 43. The dust cap prevents accumulation of foreign matter about the plug normally screwed in the tapped hole 40. A packing washer 44 preferably is placed about the tapped hole 40, between the housing 13 and pillow block 42, to prevent any foreign matter which may accumulate around the said hole, from entering between said housing and pillow block.

It is apparent from the foregoing description that the improved anti-friction shaft mounting is thoroughly sealed to prevent leakage of a liquid lubricant which heretofore could not be used with complete satisfaction. Also the provision of continuous unbroken surfaces upon which the sealing rings ride maintain the seals in first class condition. The novel structure of the male sleeve 11 insures positive contraction of said sleeve and tight gripping of the shaft.

The mounting illustrated in Figs. 4 and 5 is substantially like that previously described, but in this instance a male sleeve 45, having a substantially straight periphery for a greater part of its length, has an upward taper 46 at one end to provide a suitable seat for the tapered inside bore of the inner bearing race 21, and circumferentially aligned countersinks 53ª at its other end.

The sleeve 45 has longitudinal slits 47 at its tapered end to permit it to contract when the inner race is moved longitudinally thereover. Longitudinal movement of the inner race over the taper 46 is accomplished by providing a female sleeve 48 which fits snugly on the end of the male sleeve 45 having countersinks 53ª. To assemble, the inner race is slipped over male sleeve 45 and the female sleeve is moved longitudinally on the male sleeve into abutment with one side face of said inner race. In this position cup pointed set screws 53 in the flange 52 of the female sleeve are in approximate alignment with countersinks 53ª. When the set screws are tightened they engage one side of said countersinks and such engagement moves the female sleeve toward the tapered end of the male sleeve to force the inner bearing race over said taper to bind the male sleeve to the shaft. Another female sleeve 51, also flanged at 52, is secured to the shaft 12 by set screws 54 and projects inwardly through the bored end wall of the housing to tightly abut the other side face of the inner race 21.

This construction affords a smooth surface for each sealing ring 28 to ride along and satisfactorily eliminates any play between the female sleeve 45 and shaft 12, and between said sleeve and the inner race 21.

The mounting illustrated in Figs. 6 and 7 embodies a structure in which the inner race 21 is mounted directly upon the shaft 12 and is securely held in position with respect to the housing 13 by opposed sleeves 51ª—51ᵇ which are substantially like the sleeve 51 of the mounting illustrated in Fig. 4. Novel means is provided to center the anti-friction bearing relative to the housing 13 and to bind it to the shaft and to this end, the flange 52 of sleeve 51ª is provided with a plurality of circumferential aligned spaced openings 54, adapted to receive a drill to countersink the shaft. An equal number of set screws 17 are screwed into the flange 52, spaced circumferentially with one positioned midway between adjacent openings 54. The set screws also are aligned circumferentially but the plane of said aligned set screws is offset inwardly from the plane of openings 54, as indicated.

In assembling, the sleeve 51ª is moved along the shaft against one side face of the inner race 21, so that the shoulder 25, formed by flange 52 abuts the recessed face 26 of the cap 27 and the set screws 17 are temporarily tightened. Said shaft is then countersunk through openings 54, as shown in Fig. 7. After countersinking the shaft, the set screws 17 are loosened and the sleeve is rotated about the shaft to locate the set screws in approximate alignment with the countersinks, drawing the flange 52 on sleeve 51ª away from the recessed face 26 of the cap to insure the required working clearance therebetween.

A sleeve 51ᵇ is similarly constructed but in this instance the circumferentially aligned openings 54ª are offset inwardly as indicated from the plane of the circumferentially aligned set screws 17ª. As the set screws 17ª engage the countersinks in the shaft, the sleeve is forced tightly against the face of the inner race 21 to bind it securely between sleeves 51ª and 51ᵇ.

In Fig. 8 the anti-friction bearing is positioned with its outer race 56 abutting an inwardly extending flange 57 on cap 27a and with its inner race 21 abutting the end of sleeve 22a. The other sleeve 51b is the same as sleeve 51b shown in Fig. 6. When so mounted, the bearing is securely held tight on the shaft and oil leakage between the side faces of the inner race and the abutting sleeves is prevented. A positioned or non-floating bearing of the type shown in Fig. 8, requires no offset openings in the sleeve 22a because the positioned bearing must not be moved away from the flange 57 of cap 27a.

Fig. 9 illustrates the use of the annular cap 27, shown in Figs. 1, 4 and 6, in a positioned or non-floating bearing of the type shown in Fig. 8. This adaption readily is accomplished by placing a spacer ring 58 on each side of the outer race 56 of the bearing. When the annular cap 27 is locked in place the flange 59 thereof abuts the adjacent spacer ring and binds the rings and the outer race tightly between said flange and the usual shoulder 60 in the housing.

From the foregoing it is apparent that the improved mountings embody novel means to prevent the entrance of foreign matter into the bearing or between its various moving parts. Novel means also is provided to removably retain the annular cap within the housing. It is apparent that the sealing rings are saved from the destructive wear encountered in known types of mountings because of the non-slitted surface provided by the improved sleeves. Tight sealing of the anti-friction bearing within the mounting permits the use of an oil lubricant and the general construction of the mounting insures accurate and permanent location of the anti-friction bearing within the mounting.

Although exemplary embodiments of the improved mounting have been illustrated in the accompanying drawings and described in detail in the foregoing specification, it is to be understood that the structures shown may vary in detail and that metal or other known types of sealing rings may be used without departing from the spirit of the invention or the scope of the appended claims.

We claim:

1. A device of the class described, having in combination, a pillow block, a housing mounted therein, said housing being formed with an integral end wall provided with a bore, the opposite end being open, an annular cap mounted in said opposite end, having a bore concentric with said end wall bore, rings, one mounted in each of said bores, a male sleeve adapted to retain a shaft and carry an anti-friction bearing, said sleeve being formed with a flange at one end, external threads at the other end and a circumferential slotted groove between said ends, the part of the sleeve between the flange and the groove being arranged to cooperate with the ring in the end wall bore to provide a seal, the part of said sleeve extending from said groove towards said threads being externally tapered and having longitudinal slits communicating with the slots, and a female sleeve adapted to retain the shaft, said female sleeve being formed with a flange at one end and internal threads at the other end, the external periphery of said female sleeve being arranged to cooperate with the ring in the cap to provide a seal, mating engagement between said sleeves, adapting one to force the anti-friction bearing along the other to contract said other one, to adapt it to bind on the shaft.

2. A device of the class described, having in combination, a housing formed with an integral end wall provided with a bore, the opposite end being open, an annular cap mounted in said opposite end, having a bore concentric with said end wall bore, rings, one mounted in each of said bores, a male sleeve adapted to retain a shaft and carry an anti-friction bearing, said sleeve being formed with a flange at one end, external threads at the other end and a circumferential slotted groove between said ends, the part of the sleeve between the flange and the groove being arranged to cooperate with the ring in the end wall bore to provide a seal, the part of said sleeve extending from said groove towards said threads being externally tapered and having longitudinal slits communicating with the slots and a female sleeve adapted to retain the shaft, said female sleeve being formed with a flange at one end and internal threads at the other end, mating engagement between said internal and external threads so that the female sleeve is adapted to force the bearing along the male sleeve to contract it to adapt it to bind to the shaft, the external periphery of the female sleeve being arranged to cooperate with the ring in the cap to provide a seal.

3. A device of the class described, having in combination, a housing formed with an integral end wall provided with a bore, the opposite end being open, an annular cap mounted in said opposite end, having a bore concentric with said end wall bore, a male sleeve adapted to retain a shaft and carry an anti-friction bearing, said sleeve being formed with a flange at one end, external threads at the other end and a circumferential slotted groove between said ends, the part of the sleeve between the flange and the groove being mounted in the end wall bore, the part of said sleeve extending from said groove towards said threads being externally tapered and having longitudinal slits communicating with said slots and a female sleeve, mounted in the bore of the cap, adapted to retain the shaft, said female sleeve being formed with a flange at one end and internal threads at the other end, mating engagement between the threads of said sleeves, the external periphery of the female sleeve being arranged to cooperate with the bore in said cap, said sleeves being arranged so that the female sleeve is adapted to force the bearing along the male sleeve to contract it to adapt it to bind to the shaft.

4. A device of the class described, having in combination, a pillow block, a housing mounted therein, a tapped opening in said housing adapted to align with an opening in the pillow block, said tapped opening being adapted to be closed by a plug, a sealing ring around said tapped opening between said pillow block and housing, said housing being formed with an integral end wall provided with a bore, the opposite end being open, an annular cap mounted in said opposite end, having a bore concentric with said end wall bore, rings, one mounted in each of said bores, a male sleeve, adapted to retain a shaft and carry an anti-friction bearing, said sleeve being formed with a flange at one end, external threads at the other end and a circumferential slotted groove between said ends, the part of the sleeve between the flange and the groove being arranged to cooperate with the ring in the end wall bore to provide a turning fit seal, the part of said sleeve extending from said groove towards said threads being externally tapered and having longitudinal slits communicating with the slots, and a female sleeve adapted to retain the shaft, said female sleeve being formed with a flange at one end and internal threads at the other end so that the female sleeve is adapted to force the bearing along the male sleeve to contract it to adapt it to bind on the shaft.

5. A device of the class described, having in combination, a housing formed with an integral bored end wall, the opposite end being open and provided with a shallow circumferential groove, an annular cap mounted in said opposite end opening, having a bore concentric with said end wall bore, a circumferential groove in the outside periphery of said cap in approximate register with said groove in the housing, a split ring mounted in the groove in the cap, means mounted in said cap to force the ring into said groove in the housing, rings, one mounted in each of said bores, a male sleeve, adapted to retain a shaft and carry an anti-friction bearing, said sleeve being formed with a flange at one end, external threads at the other end and a circumferential slotted groove between said ends, the part of the sleeve between the flange and the groove being arranged to cooperate with the ring in the end wall bore to provide a seal, the part of said sleeve extending from said groove towards said threads being externally tapered and having longitudinal slits communicating with the slots and a female sleeve adapted to retain the shaft, said female sleeve being formed with a flange at one end and internal threads at the other end, mating engagement between said sleeves, said sleeves being arranged so that said female sleeve is adapted to force the bearing along said male sleeve to contract it to adapt it to bind on the shaft.

6. In an article of the character described, the combination of, a housing open at one end adapted to receive a shaft having an anti-friction bearing mounted thereon, a shallow groove in the periphery of said opening, an annular cap mounted in said opening, a groove in the outside periphery of said cap, a normally contracted expansion ring mounted in the groove in said cap, and a plurality of set screws in said cap adapted to engage beneath said ring to urge it into engagement with said shallow groove.

7. In an article of the class described including a housing open at one end and having a shallow peripheral groove in the opening, the combination of, an annular peripheral externally grooved cap, formed with a shoulder at one end, adaped to be mounted in said open end, said grooves being adapted to register approximately, an expansible ring mounted in the groove of said cap, and a plurality of set screws mounted in said cap adapted to engage said ring to force it into interlocking engagement with the shallow groove and adapted to draw said shoulder against the housing.

8. In a device of the character described including a housing adapted to have a shaft extend therethrough, and an anti-friction bearing having its inner race mounted on said shaft and its outer race mounted in said housing, the combination of, a sleeve adapted to be mounted on said shaft, adapted to abut one face of the inner race, a plurality of circumferentially aligned spaced openings in said sleeve adapted to receive a tool to countersink said shaft, circumferentially aligned set screws in said sleeve spaced one between adjacent openings and offset from the plane of said openings toward said race, said set screws being adapted, upon relocating said sleeve, to engage the countersinks to secure the sleeve to the shaft, a second sleeve adapted to abut the opposed face of the inner race and urge said race tightly against the secured sleeve, a plurality of circumferentially aligned spaced openings in the second sleeve adapted to receive a tool to countersink said shaft, and circumferentially aligned set screws in said sleeve spaced one between adjacent openings and offset from the plane of said openings away from said race, said set screws being adapted, upon relocating said sleeve, to engage in the countersinks to secure said sleeve to said shaft and tightly wedge the inner race between the two sleeves.

9. In a device of the character described including a housing adapted to have a shaft extend therethrough, and an anti-friction bearing having its inner race mounted on said shaft and its outer race mounted in said housing, the combination of, sleeves adapted to be mounted on said shaft one on each side of said inner race adapted to abut the opposed faces of said race, a plurality of circumferentially aligned spaced openings in each sleeve adapted to receive a tool to countersink said shaft, and circumferentially aligned set screws in each of said sleeves similarly spaced one between adjacent openings adapted, upon relocating said sleeves, to engage in said countersinks to secure the sleeves to the shaft and bind the inner race.

10. In a device of the character described, a locking sleeve, adapted to be mounted on a shaft, having a plurality of circumferentially aligned spaced openings adapted to receive a tool to countersink the shaft, and circumferentially aligned set screws spaced one midway between adjacent openings and offset from the plane of said openings, adapted to engage in the countersinks, upon relocating said sleeve on said shaft.

11. In a device of the character described, the combination of, a housing, adapted to have a shaft extend therethrough, and an anti-friction bearing having its outer race mounted in said housing and its inner race mounted on said shaft, said housing including an integral bored end wall and being open at its other end, an annular cap, having a bore, mounted in said open end, and sealing rings in said bores, with means to locate and secure said bearing in place, said means comprising, in combination, a sleeve mounted in said housing adapted to be secured to said shaft and abut one face of the inner race, a second sleeve mounted in said housing on said shaft, a plurality of circumferentially aligned space openings in said second sleeve adapted to receive a tool to countersink said shaft, a plurality of circumferentially aligned spaced set screws in said second sleeve offset from the plane of the openings adapted, upon relocating said sleeve, to engage in said countersinks to secure said sleeve in place, said sleeve being adapted to tightly abut the other face of the inner race to retain the bearing in place, and an unbroken periphery on each of said sleeves adapted to cooperate with said sealing rings.

BERNARD S. OKNER.
CHARLES NELSON, JR.